US008775507B2

(12) United States Patent
Wang et al.

(10) Patent No.: US 8,775,507 B2
(45) Date of Patent: Jul. 8, 2014

(54) REST INTERFACE FOR JOB SUBMISSION

(75) Inventors: Ruiyi Wang, Redmond, WA (US); Tianchi Ma, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 212 days.

(21) Appl. No.: 13/344,344

(22) Filed: Jan. 5, 2012

(65) Prior Publication Data

US 2013/0179488 A1 Jul. 11, 2013

(51) Int. Cl.
*G06F 15/16* (2006.01)
(52) U.S. Cl.
USPC .......................................... 709/203; 709/201
(58) Field of Classification Search
USPC .................................................. 709/201, 203
See application file for complete search history.

(56) References Cited

U.S. PATENT DOCUMENTS

| | | | |
|---|---|---|---|
| 2009/0276771 A1 | 11/2009 | Nickolov et al. | |
| 2011/0016379 A1 | 1/2011 | McColl et al. | |
| 2011/0154173 A1 | 6/2011 | Herlein | |
| 2011/0221962 A1 | 9/2011 | Khosravy et al. | |
| 2011/0225658 A1 | 9/2011 | Khosravy et al. | |
| 2011/0276538 A1 | 11/2011 | Knapp et al. | |
| 2011/0276622 A1 | 11/2011 | Knapp et al. | |
| 2011/0276656 A1 | 11/2011 | Knapp et al. | |
| 2012/0290679 A1* | 11/2012 | Steinhauer | 709/217 |
| 2013/0254768 A1* | 9/2013 | Wipfel et al. | 718/1 |

OTHER PUBLICATIONS

Leitner, Philipp, et al., "Daios: Efficient Dynamic Web Service Invocation", Published by the IEEE Computer Society, May/Jun. 2009, pp. 72-80.

Cholia, Shreyas, et al., "NEWT: A RESTful Service for Building High Performance Computing Web Applications", Gateway Computing Environments Workshop, 2010, 1-11.

Griffin, K., et al. "Rest for Bliss" Representational State Transfer (REST) for Feature Configuration in Session Initiation Protocol (SIP), Oct. 27, 2008, 12 pages.

Khare, Rohit, et al., "Extending the Representational State Transfer (REST) Architectural Style for Decentralized Systems", Proceedings of the 26th International Conference on Software Engineering (ICSE'04), 2004 IEEE, 10 pages.

opensocial.org, "RESTful API Specification", May 27, 2008, 15 pages.

Fielding, Roy Thomas, "Architectural Styles and the Design of Network-based Software Architectures", University of California, Irvine, 2000, 180 pages.

* cited by examiner

*Primary Examiner* — Yves Dalencourt
(74) *Attorney, Agent, or Firm* — Nicholas Chen; David Andrews; Micky Minhas

(57) ABSTRACT

Methods, systems, and computer program products for REST interface for job submission are provided for use at a computing system that includes one or more clients, one or more hosting programs and a cluster that includes a plurality of schedulers. The hosting program works between the clients on different platforms and the schedulers of the cluster system. The hosting program receives requests from the clients and then submits the requests to the schedulers. The communication between the hosting program and the schedulers may be based on .Net remoting protocol. Regardless of what platform the clients use, the hosting program maintains a same user interface to all the clients and the communication between the clients and the hosting program may be based on Representational State Transfer ("REST"). In addition, the hosting program also delegates identities to the clients when it receives multiple authentications from the schedulers.

20 Claims, 2 Drawing Sheets

200

201
Receiving A Plurality Of Requests From The Clients Based On A First Communication Protocol, The Plurality Of Requests Including Performing A Plurality Of Computing Jobs And Monitoring A Job Queue, Wherein The Plurality Of Computing Jobs Each Have A Plurality Of Properties Exposed As A Plurality Of Uniform Resource Identifiers, The Hosting Programs Maintaining One User Interface For The Clients, The Clients Running At Two Or More Operating Platforms Including A First Operating Platform And A Second Operating Platform, Wherein The First Operating Platform Differs From The Second Operating Platform

202
Submitting The Requests To The Schedulers Such That The Hosting Programs Switch To A Second Communication Protocol

203
Receiving A Plurality Of Authentications From The Schedulers, Wherein The Authentications Contain A Plurality Of Identities

204
Delegating The Identities To The Clients

*Figure 2*

REST INTERFACE FOR JOB SUBMISSION

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

High-performance computing ("HPC") clusters allow the users to submit computing jobs to the clusters. The computing jobs run on cluster resources such that the computing jobs will not consume the users' local computing resources. That being said, the users could be operating on different platforms including non-Windows platforms such as Mac OS or Linux. Thus, the High-performance computing cluster need be able to receiving requests of computing jobs from different platforms.

Further, while the High-performance cluster allows job submission from different platforms, the application programming interfaces ("API") are usually different between different platforms. These different APIs can cause independent software vendors ("ISV") substantial difficulties in building their applications.

BRIEF SUMMARY

The present invention extends to methods, systems, and computer program products for REST interface for job submission. At a cluster system, a hosting program works between the clients on different platforms and the schedulers of the cluster system. The hosting program receives requests from the clients and then submits the requests to the schedulers. Independent of what platform the clients use, the hosting program maintains a consistent user interface to clients. Communication between the clients and the hosting program can be based on Representational State Transfer ("REST"). In addition, the hosting program also delegates identities to the clients when it receives multiple authentications from the schedulers.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flow chart of an example method for providing an interface for the clients for requests submission.

DETAILED DESCRIPTION

Figure 1:
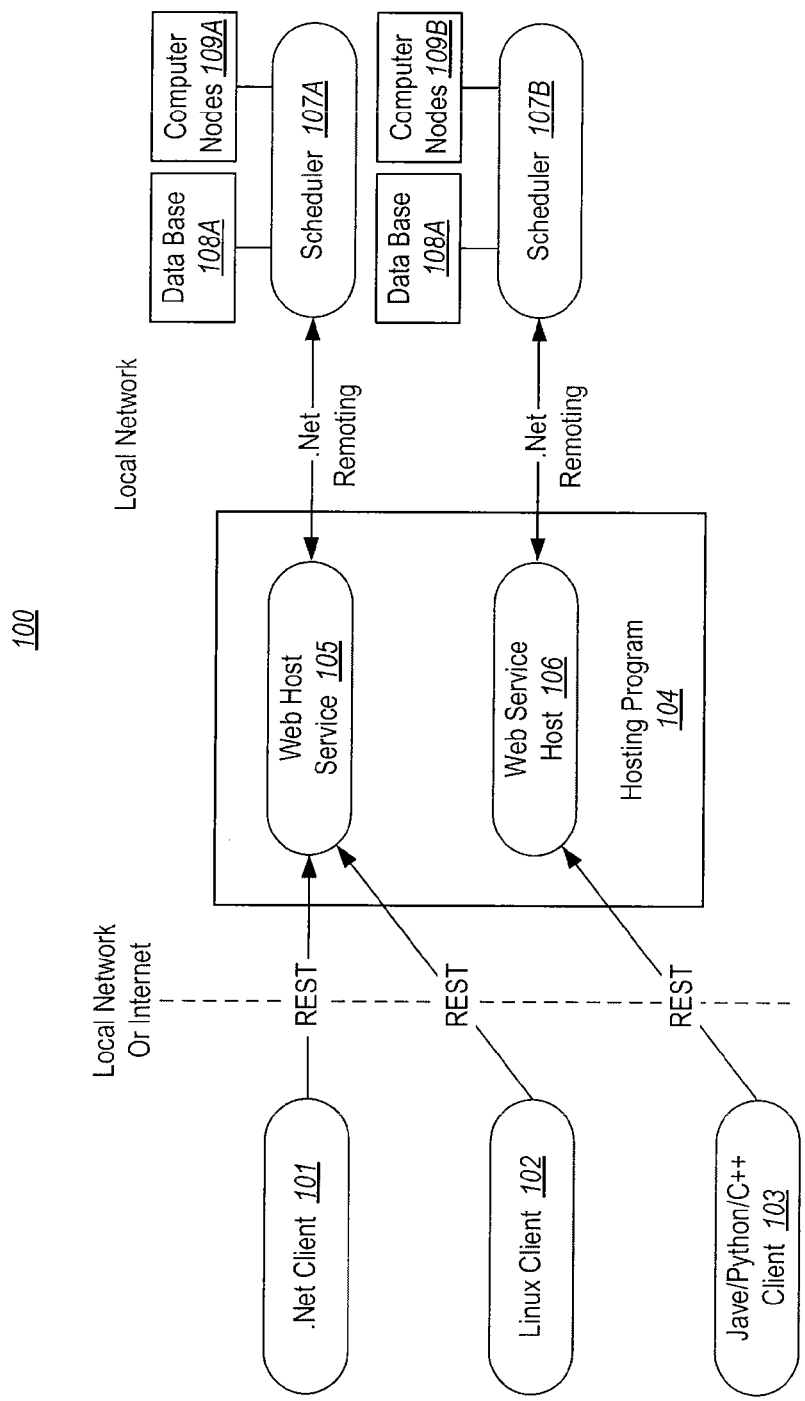
FIG. 1 illustrates an example computer architecture that facilitates REST interface for job submission.

The present invention extends to methods, systems, and computer program products for REST interface for job submission. At a cluster system, a hosting program works between the clients on different platforms and the schedulers of the cluster system. The hosting program receives requests from the clients and then submits the requests to the schedulers. Independent of what platform the clients use, the hosting program maintains a consistent user interface to clients. Communication between the clients and the hosting program can be based on Representational State Transfer ("REST"). In addition, the hosting program also delegates identities to the clients when it receives multiple authentications from the schedulers.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Representational State Transfer (REST) is a style of software architecture for distributed hypermedia systems such as World Wide Web. REST-style architectures consist of clients and servers. Clients initiate requests to servers; servers process requests and return appropriate responses. Requests and responses are built around the transfer of representations of resources. A resource can be essentially any coherent and meaningful concept that may be addressed. A representation of a resource can be, for example, a document that captures the current or intended state of a resource.

The client begins sending requests when it is ready to make the transition to a new state. While one or more requests are outstanding, the client is considered to be in transition. The representation of each application state contains links that may be used next time the client chooses to initiate a new state transition.

REST can be used in the context of HTTP, as well as other protocol. For example, RESTful architectures can be based on other Application Layer protocol, such as, those that provide a uniform vocabulary for applications based on the transfer of meaningful representational state. RESTful applications maximize the use of the pre-existing, interface and other built-in capabilities provided by the chosen network protocol, and minimize the addition of new application-specific features on top of it.

FIG. 1 illustrates an example computer architecture 100 that facilitates a REST interface for job submission. Referring to FIG. 1, computer architecture 100 includes .Net client 101, Linux client 102, Jave/Python/C++ client 103, hosting program 104, and schedulers 107A and 107B. Each of the depicted components is connected to one another over (or is part of) a network, such as, for example, a Local Area Network ("LAN"), a Wide Area Network ("WAN"), and even the Internet. Accordingly, each of the depicted components as well as any other connected components and their sub components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Hosting program 104 includes web service host 105 and web service host 106. Web service host 105 communicates with .Net client 101 and Linux client 102. Web service host 106 communicates with Jave/Python/C++ client 103. The communication can be established over local network or Internet. Notably, each web service host is capable of communicating with more than two clients and such clients may be operating on same or different platforms. For example, web service host 105 can communicate with a .Net client, two Linux clients, and three Jave/Python/C++ clients.

To optimize for performance or interoperation, as depicted in FIG. 1, hosting program 104 provides a REST interface to all the clients regardless of the type of the platform. The clients then can submit requests to hosting program 104, the requests including computing jobs and monitoring the job queue.

Web service host 105 and 106 then submits the request to schedulers 107A and 107B respectively over a local network. Local network communications can be based on .Net remoting interface. Each of schedulers 107A and 107B can be connected to a corresponding database 108A and 108B and computer nodes 109A and 109B respectively.

FIG. 2 illustrates a flow chart of an example method 200 for providing an interface for the clients for requests submission. Method 200 will be described with respect to the components and data of computer architecture 100.

Method 200 includes an act of receiving a plurality of requests from the clients based on a first communication protocol, the plurality of requests including performing a plurality of computing jobs and monitoring a job queue, wherein the plurality of computing jobs each have a plurality of properties exposed as a plurality of uniform resource identifiers, the hosting programs maintaining one user interface for the clients, the clients running at two or more operating platforms including a first operating platform and a second operating platform, wherein the first operating platform differs from the second operating platform (act 201). For example, .Net client 101, Linux client 102, and Jave/Python/

C++ client 103 can submit requests to hosting program 104. In addition, the clients possess substantial state information of the schedulers before the clients submit the requests.

The requests can include performing multiple computing jobs and monitoring a job queue. The multiple computing jobs that have multiple properties are exposed as a plurality of uniform resource identifiers. Specifically, the job queue can be retrieved according to the uniform resource identifiers, be updated, and be displayed. The state information of the computing jobs can be acquired during retrieving the job queue. When updating the job queue, only the computing jobs whose state information changed after the job queue is retrieved are to be transmitted such that the amount of data transmitting over the network can be largely reduced.

In addition, since the multiple computing jobs have multiple properties, the clients can determine their interested properties and further can request to display only the computing jobs having the properties specified by the clients.

Further, the host programs maintain one user interface for the clients, the clients running at two or more operating platforms including a first operating platform and a second operating platform, wherein the first operating platform differs from the second operating platform. For example, hosting program 104 can provide REST interface to all the clients including .Net client 101, Linux client 102, and Jave/Python/C++ client 103. Each of the clients is working on different platforms including Windows, Linux, and Java.

Method 200 includes an act of submitting the requests to the schedulers such that the hosting programs switch to a second communication protocol (act 202). For example, hosting program 104 can submit the requests from .Net client 101, Linux client 102, and Jave/Python/C++ client 103 to schedulers 107. The second communication protocol can be the same or different from the first protocol mentioned in act 204.

Method 200 includes an act of receiving a plurality of authentications from the schedulers, wherein the authentications contain a plurality of identities (act 203). For example, hosting program 104 can receive authentications from schedulers 107A and 107B, such authentications including multiple identities.

Method 200 includes an act of delegating the identities to the clients (act 204). For example, hosting program 104 can delegate the multiple identities to .Net client 101, Linux client 102, and Jave/Python/C++ client 103. With the hosting program 104 working between clients 101, 102, and 103 and schedulers 107A and 1078B, the schedulers 107A and 107B can delegate identities to the clients that work on non-Windows platforms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computing system, the computing system including one or more clients, one or more hosting programs, and a cluster, the cluster including a plurality of schedulers, the schedulers each having a database and being connected to a plurality of computing nodes, a method for providing an interface for the one or more clients for requests submission, the method comprising:
   an act of receiving a plurality of requests from the one or more clients based on a first communication protocol, the plurality of requests including performing a plurality of computing jobs and monitoring a job queue, wherein the plurality of computing jobs each have a plurality of properties exposed as a plurality of uniform resource identifiers, the one or more hosting programs maintaining one user interface for the one or more clients, the one or more clients running at two or more operating platforms including a first operating platform and a second operating platform, wherein the first operating platform differs from the second operating platform;
   an act of submitting the requests to the schedulers such that the one or more hosting programs switch to a second communication protocol;
   an act of receiving a plurality of authentications from the schedulers, wherein the authentications contain a plurality of identities; and
   an act of delegating the identities to the one or more clients.

2. The method as recited in claim 1, wherein said monitoring the job queue further comprises:
   an act of retrieving the job queue according to the uniform resource identifiers;
   an act of updating the job queue; and
   an act of displaying the job queue.

3. The method as recited in claim 1, wherein the first communication protocol is different from the second communication protocol.

4. The method as recited in claim 1, wherein the first communication protocol is the same as the second communication protocol.

5. The methods as recited in claim 1, wherein the one or more clients possess substantial state information of the schedulers before the clients submit the requests.

6. The method as recited in claim 2, wherein the act of retrieving the job queue further comprises acquiring state information of the plurality of computing jobs.

7. The method as recited in claim 2, wherein the act of updating the job queue further comprises transmitting the state information of the plurality of computing jobs when the state information changed after the act of retrieving the job queue.

8. The method as recited in claim 2, wherein the act of displaying the job queue further comprises determining a plurality of specified properties of the plurality of computing jobs and displaying only a group of the plurality of the computing jobs having the plurality of specified properties.

9. A computer storage device having stored computer-executable instructions which, when executed by one or more processors of a computing system, implement a method for providing an interface for one or more clients for requests submission in a computing environment that includes the one or more clients, one or more hosting programs, and a cluster that includes a plurality of schedulers, each of the schedulers having a database and being connected to a plurality of computing nodes, wherein the method includes the computing system performing the following:
   receiving a plurality of requests from the clients based on a first communication protocol, the plurality of requests including performing a plurality of computing jobs and monitoring a job queue, wherein the plurality of computing jobs each having a plurality of properties are exposed as a plurality of uniform resource identifiers;
   submitting the requests to the schedulers such that the one or more hosting programs switch to a second communication protocol; and
   maintaining one user interface for the one or more clients, the one or more clients running at two or more operating platforms including a first operating platform and a second operating platform.

10. The computer storage device as recited in claim 9, wherein the first operating platform differs from the second operating platform.

11. The computer storage device as recited in claim 9, wherein the method further comprises:
   receiving a plurality of authentications from the schedulers, wherein the authentications contain a plurality of identities; and
   delegating the identities to the one or more clients.

12. The computer storage device as recited in claim 9, wherein to the method further comprises:
   retrieving the job queue according to the uniform resource identifiers;
   updating the job queue; and
   displaying the job queue.

13. The computer storage device as recited in claim 9, wherein the first communication protocol is different from the second communication protocol.

14. The computer storage device as recited in claim 9, wherein the first communication protocol is the same as the second communication protocol.

15. The computer storage device as recited in claim 9, wherein the one or more clients possess substantial state information of the schedulers before the one or more clients submit the requests.

16. The computer storage device as recited in claim 12, wherein the method further includes acquiring state information of the plurality of computing jobs.

17. The computer storage device as recited in claim 12, wherein the method further comprises transmitting the state information of the plurality of computing jobs when the state information changed after retrieving the job queue.

18. The computer storage device as recited in claim 12, wherein the method further includes determining a first plurality of specified properties of the plurality of computing jobs and displaying only a group of the plurality of the computing jobs having the first plurality of specified properties.

19. The computer storage device as recited in claim 12, wherein the method further includes determining a second plurality of specified properties of the plurality of computing jobs and displaying only a group of the plurality of the computing jobs not having the second plurality of specified properties.

20. A computing system comprising:
   at least one processor; and
   one or more storage device having stored computer-executable instructions which, when executed by the at least one processor, implement a method in a computing environment that includes one or more clients, one or more hosting programs, and a cluster with a plurality of schedulers, the schedulers each having a database and being connected to a plurality of computing nodes, wherein the method includes the computing system performing the following:
   an act of receiving a plurality of requests from the one or more clients based on a first communication protocol, the plurality of requests including performing a plurality of computing jobs and monitoring a job queue, wherein the plurality of computing jobs each having a plurality of properties are exposed as a plurality of uniform resource identifiers, wherein monitoring a job queue further comprises:
      an act of retrieving the job queue according to the uniform resource identifiers further comprising an act of acquiring state information of the plurality of computing jobs;
      an act of updating the job queue further comprising an act of transmitting the state information of the plurality of computing jobs when the state information changed after the act of retrieving the job queue; and
      an act of displaying the job queue further comprising an act of determining a plurality of specified properties of the plurality of computing jobs and displaying only a group of the plurality of the computing jobs having the plurality of specified properties;
   an act of submitting the requests to the schedulers such that the one or more hosting programs switch to a second communication protocol;
   an act of maintaining one user interface for the one or more clients, the one or more clients running at two or more operating platforms including a first operating platform and a second operating platform, wherein the first operating platform differs from the second operating platform;
   an act of receiving a plurality of authentications from the schedulers, wherein the authentications contain a plurality of identities; and
   an act of delegating the identities to the one or more clients.

* * * * *